(12) United States Patent
McLellan et al.

(10) Patent No.: US 12,346,187 B2
(45) Date of Patent: Jul. 1, 2025

(54) SYSTEMS AND METHODS FOR CLOCK GATING

(71) Applicant: SiFive, Inc., Santa Clara, CA (US)

(72) Inventors: Edward McLellan, Holliston, MA (US); Arjun Pal Chowdury, Austin, TX (US); Paul Walmsley, San Mateo, CA (US)

(73) Assignee: SiFive, Inc., Santa Clara, CA (US)

( * ) Notice: Subject to any disclaimer, the term of this patent is extended or adjusted under 35 U.S.C. 154(b) by 0 days.

(21) Appl. No.: 18/744,598

(22) Filed: Jun. 15, 2024

(65) Prior Publication Data

US 2024/0411356 A1    Dec. 12, 2024

Related U.S. Application Data (63) Continuation of application No. PCT/US2022/051146, filed on Nov. 29, 2022.

(60) Provisional application No. 63/290,870, filed on Dec. 17, 2021.

(51) Int. Cl.
*G06F 1/32* (2019.01)
*G06F 1/3206* (2019.01)
*G06F 1/3237* (2019.01)

(52) U.S. Cl.
CPC .......... *G06F 1/3237* (2013.01); *G06F 1/3206* (2013.01)

(58) Field of Classification Search
CPC ....................................................... G06F 1/32
See application file for complete search history.

(56) References Cited

U.S. PATENT DOCUMENTS

| | | | | |
|---|---|---|---|---|
| 7,605,612 B1 * | 10/2009 | Chiang | ................. | G06F 1/3203 |
| | | | | 327/544 |
| 2006/0225046 A1 * | 10/2006 | Feekes | ................. | G06F 1/3237 |
| | | | | 712/E9.063 |
| 2012/0102344 A1 | 4/2012 | Kocev et al. | | |
| 2015/0121106 A1 | 4/2015 | Eckert et al. | | |
| 2016/0077575 A1 | 3/2016 | Paul et al. | | |
| 2016/0321070 A1 * | 11/2016 | Okazaki | ............. | G06F 9/30083 |
| 2016/0321183 A1 | 11/2016 | Govindan et al. | | |

OTHER PUBLICATIONS

International Search Report for Application No. PCT/US2022/051146, mailed Apr. 3, 2023, 3 pages.
International Search Report and Written Opinion for Application No. PCT/US2022/051146, mailed Apr. 3, 2023, 14 pages.
International Preliminary Report on Patentability for Application No. PCT/US2022/051146, mailed Jun. 27, 2024, 11 pages.

* cited by examiner

*Primary Examiner* — Paul B Yanchus, III
(74) *Attorney, Agent, or Firm* — Kilpatrick Townsend & Stockton LLP (57) ABSTRACT

Described are systems and methods for clock gating components on a system-on-chip. A processing system includes one or more cores, each core including a clock gating enable bit register which is set by software when an expected idle period of the core meets or exceeds a clock gating threshold, and a power management unit connected to the one or more cores. The power management unit configured to receive an idle notification from a core of the one or more cores and initiate clock gating a clock associated with the core when the core and additional logic is quiescent and the clock gating enable bit register is set. The clock gating threshold is a defined magnitude greater than a clock wake-up time.

20 Claims, 7 Drawing Sheets

SYSTEMS AND METHODS FOR CLOCK GATING

CROSS-REFERENCES TO RELATED APPLICATIONS

This application is a continuation of International Application No. PCT/US2022/051146, filed Nov. 29, 2022, which claims priority to U.S. Provisional Application No. 63/290,870, filed Dec. 17, 2021, the contents of which are incorporated herein by reference in their entirety.

FIELD OF TECHNOLOGY

This disclosure relates to power management and in particular, clock gating cores, uncores, caches, and other components on a chip or on a system-on-chip (SoC)

BACKGROUND

Power is tied to overall SoC performance including, but not limited to, battery life, energy consumption, thermal profile, cooling requirements, noise profile, system stability, sustainability, and operational costs. Power management techniques can be used to control power consumption by controlling the clock rate. Clock gating is a power management technique for reducing dynamic power usage by removing the clock signal when a core, for example, is not in use or is in an idle mode. However, when a significant portion of the clock distribution network is gated, there may be performance or exit penalties associated with disabling and then enabling clock gating. For example, reenabling or waking the clock circuit requires a minimum number of clock cycles ("wake-up time"). For example, the wake-up time can be in the order of 10 clock cycles. This delay can be due to clock domain crossing boundaries implemented in the SoC. In implementations, a single, global enable bit is used, at a reset, to set or clear clock gating based on the impact on the SoC performance. In general, as it is set or cleared only at reset, the global enable bit is static and located in a memory-mapped input/output (MMIO) register in an uncore domain (i.e., logic outside and potentially between multiple cores). However, this approach, provides no ability for per core clock gating in a multi-core architecture. In addition, the MMIO register access is slow compared to core register access in that the MIMO register imposes longer read and write latencies.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Disclosed herein are systems and methods for clock gating cores, clusters, caches, and other components on a chip or on a system-on-chip (SoC). A software or controller uses a length of a stall or idle period to determine whether to enable idle-based clock gating. By enabling the clock gating for idle times which are substantially longer than a wake-up time ("clock gating threshold time"), the power saving benefits associated with clock gating can be gained while avoiding the wake-up penalty for idle times which are longer than the wake-up time but substantially shorter than the clock gating threshold time ("short idle time"). For example, for a wake-up time of 10 clock cycles, the clock gating threshold time can be in the order of 1000 clock cycles. In implementations, the clock gating threshold time is on a per-core basis. The clock gating threshold time accounts for frequency of idle to non-idle states in a core. In some implementations, the clock gating threshold can be dynamically set based on performance. The software or controller sets a clock gating enable bit in each configuration and status register (CSR) for each core. The clock gating enable bit allows clock gating when set and disallows clock gating otherwise. The CSR allows the enable to be quickly set or cleared for a specific core. Software or a controller automatically detects that a core(s) is in an idle mode (i.e., no longer executing instructions) and that additional logic around the core is quiesced. For example, a prefetcher can remain busy after a core is idle, so all possible sources of activity must be detected before the core(s) clock(s) can be safely disabled or gated. When the software or controller determines that the core and additional logic is quiescent and the clock gating enable bit is set, the controller or software initiates clock gating of a clock associated with the core. The software or controller reenables the clock when activity is detected for a clock gated core.

These and other aspects of the present disclosure are disclosed in the following detailed description, the appended claims, and the accompanying figures.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

The term "circuit" refers to an arrangement of electronic components (e.g., transistors, resistors, capacitors, and/or inductors) that is structured to implement one or more functions. For example, a circuit may include one or more transistors interconnected to form logic gates that collectively implement a logical function. For example, the processor can be a circuit.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices and methods shown and described herein.

As used herein, the terminology "example," "embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

It is to be understood that the figures and descriptions of embodiments have been simplified to illustrate elements that are relevant for a clear understanding, while eliminating, for the purpose of clarity, many other elements found in typical processors. Those of ordinary skill in the art may recognize that other elements and/or steps are desirable and/or required in implementing the present disclosure. However, because such elements and steps do not facilitate a better understanding of the present disclosure, a discussion of such elements and steps is not provided herein.

Figure 1:
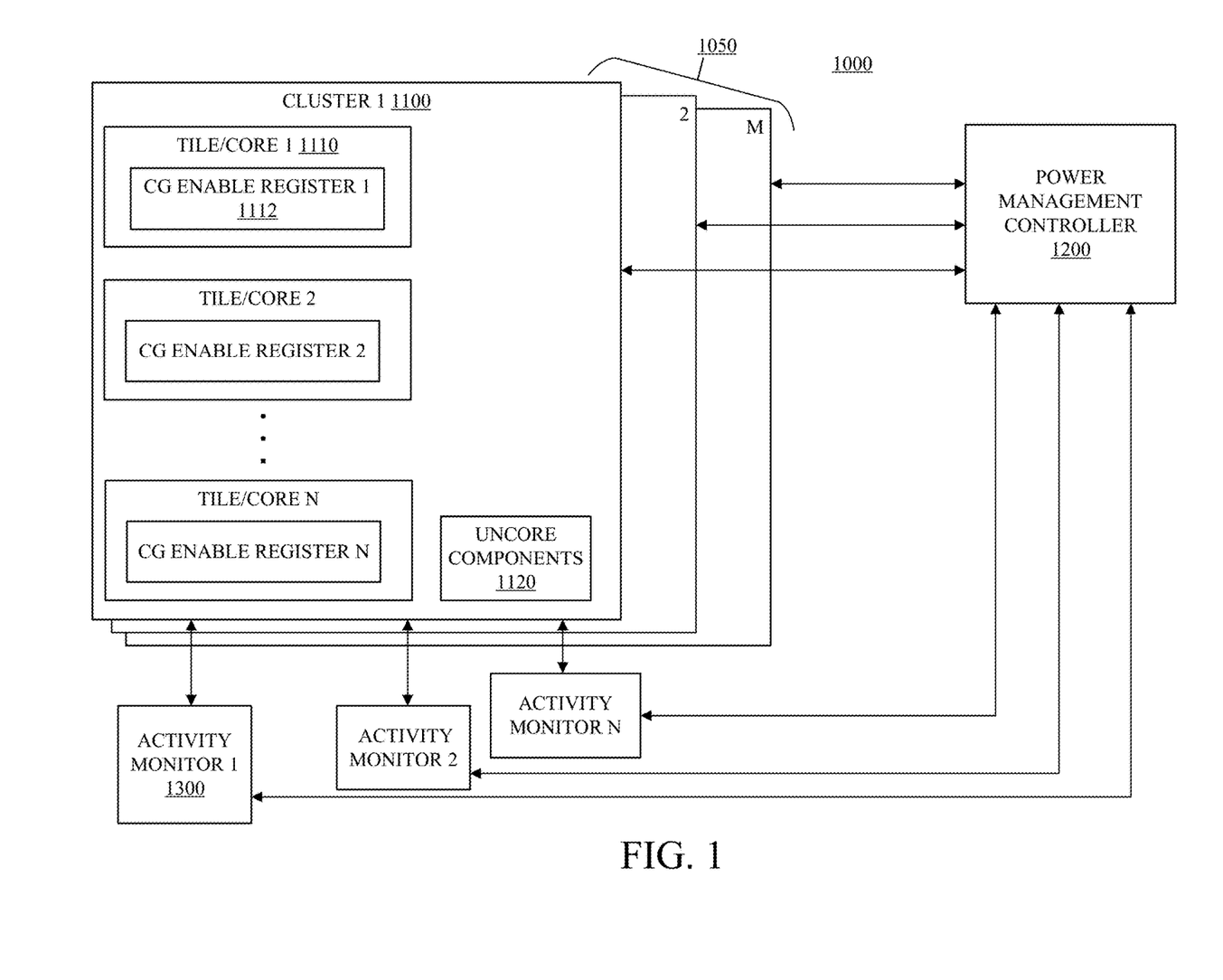
FIG. 1 is a block diagram of an example of a processing system for implementing clock gating in accordance with embodiments of this disclosure.

FIG. 1 is a block diagram of an example of a processing system 1000 for implementing clock gating in accordance with embodiments of this disclosure. The processing system 1000 can implement a pipelined architecture. The processing system 1000 can be configured to decode and execute instructions of an instruction set architecture (ISA) (e.g., a RISC-V instruction set). The instructions can execute speculatively and out-of-order in the processing system 1000. The processing system 1000 can be a compute device, a microprocessor, a microcontroller, or an IP core. The processing system 1000 can be implemented as an integrated circuit. The processing system 1000 and each element or component in the processing system 1000 is illustrative and can include additional, fewer or different devices, entities, element, components, and the like which can be similarly or differently architected without departing from the scope of the specification and claims herein. Moreover, the illustrated devices, entities, element, and components can perform other functions without departing from the scope of the specification and claims herein.

The processing system 1000 includes a complex 1050 which includes one or more clusters 1, 2, . . . , M 1100. For example, M can be 32. The one or more clusters 1, 2, . . . , M 1100 can be interconnected to or be in communication with (collectively "interconnected to") each other. A power management controller or unit 1200 can be connected to or be in communication with (collectively "connected to") to each of the one or more clusters 1, 2, . . . , M 1100. The power management controller 1200 can be a power microcontroller (PMC) and/or hardware or logic with a state machine.

Each of the one or more clusters 1, 2, . . . , M 1100 can include one or more cores 1, 2, . . . , N 1110 which can be connected to each other, to uncore components 1120, and to respective activity monitors 1, 2, . . . , N 1300. For example, N can be 4. The one or more cores 1, 2, . . . , N 1110 can also be referred to as a tile. The uncore components 1130 can include, but is not limited to, clock circuits, interrupt controllers and circuits, debug circuits, debug manager, wrappers, command line interrupt circuits and controllers, cache coherence manager, caches, and prefetchers. That is, the uncore components 1130 represent logic outside and between multiple of the one or more cores 1, 2, . . . , N 1110. Each of the one or more cores 1, 2, . . . , N 1110 can include a configuration status registers (CSR) for a clock gating enable bit or flag, namely, CG enable registers 1, 2, . . . , N 1112. The CG enable registers 1, 2, . . . , N 1112 and circuitry can enable or disable clock gating for the associated core. For example, the CG enable registers 1, 2, . . . , N 1112 can each be a one or more bit field, which can be set to enable or disable clock gating. The CG enable registers 1, 2, . . . , N 1112 can be set by the power management controller 1400 or by software. The software can be, for example, an operating system (O/S) of the processing system 1000 which runs on the complex 1050, the one or more clusters 1, 2, . . . , M 1100, the one or more cores 1, 2, . . . , N 1110, or combinations thereof. The software can monitor the idle or sleep state (e.g., counting idle cycles) to determine an expected idle period. For example, the software, such as the operating system, can use knowledge of an expected wake-up time after initiating an idle or sleep state, such as a wait for interrupt (WFI), to determine the expected idle period. In some implementations, the software can use a predictor based on idle times related to previous idle or sleep states. In some implementations, predictors can use counters that can provide hysteresis so that the predictor has memory of past events.

The power management controller 1200 can provide control outside of the clock domain (e.g., the core and/or cluster) being clock gated to determine when all activity has completed and the domain is functionally isolated and quiescent. For example, the activity can include, but is not limited to, receiving an idle period notification such as a WFI instruction retirement and checking inbound and outbound transactions, prefetcher activity, and probes. The power management controller 1200 can communicate with the managed cores and/or clusters through interconnection networks, via direct signals, or combinations thereof. The power management controller 1200 or software can initiate or trigger clock gating of a clock associated with the core, for example, when the core and the uncore components are quiescent and the clock gating enable bit is set.

The activity monitors 1, 2, ..., N 1300 can detect activity in an associated core, such as an interrupt or an incoming transaction. In implementations, the activity monitors 1, 2, ..., N 1300 can be internal to the cluster 1100. In implementations, the activity monitors 1, 2, ..., N 1300 can be internal to the complex 1050. An activity monitor detecting activity can inform or signal the power management controller 1200 that an associated clock needs to be reenabled or ungated. The power management controller 1200 can initiate reenabling of the associated clock. The software can clear the clock gating enable bit after a wake-up event or activity is detected.

Figure 2:
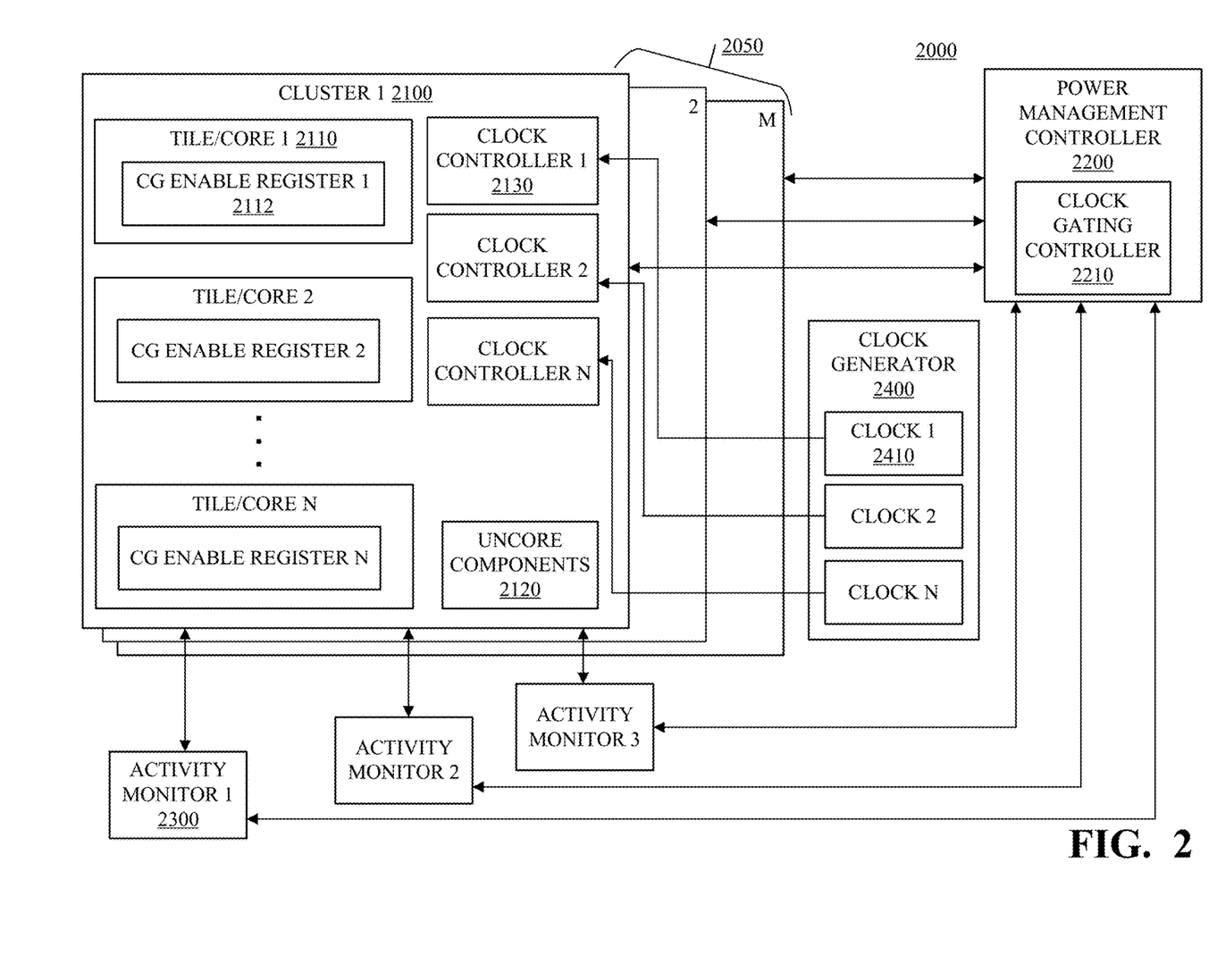
FIG. 2 is a block diagram of an example of a processing system for implementing clock gating in accordance with embodiments of this disclosure.

FIG. 2 is a block diagram of an example of a processing system 2000 for implementing clock gating in accordance with embodiments of this disclosure. The processing system 2000 can implement a pipelined architecture. The processing system 2000 can be configured to decode and execute instructions of an instruction set architecture (ISA) (e.g., a RISC-V instruction set). The instructions can execute speculatively and out-of-order in the processing system 2000. The processing system 2000 can be a compute device, a microprocessor, a microcontroller, or an IP core. The processing system 2000 can be implemented as an integrated circuit. The processing system 2000 and each element or component in the processing system 2000 is illustrative and can include additional, fewer or different devices, entities, element, components, and the like which can be similarly or differently architected without departing from the scope of the specification and claims herein. Moreover, the illustrated devices, entities, element, and components can perform other functions without departing from the scope of the specification and claims herein.

The processing system 2000 includes a complex 2050 which includes one or more clusters 1, 2, ..., M 2100. For example, M can be 32. The one or more clusters 1, 2, ..., M 2100 can be interconnected to or be in communication with (collectively "interconnected to") each other. A power management controller or unit 2200 can be connected to or be in communication with (collectively "connected to") to each of the one or more clusters 1, 2, ..., M 2100. The power management controller 2200 can be a power microcontroller (PMC) and/or hardware or logic with a state machine. The power management controller 2200 can perform power gating and clock gating. In some implementations, the power management controller 2200 can include a clock gating controller 2210. The processing system 2000 can be implemented in the processing system 1000.

Each of the one or more clusters 1, 2, ..., M 2100 can include one or more cores 1, 2, ..., N 2110 which can be connected to each other, to uncore components 2120, to respective activity monitors 1, 2, ..., N 2300, and to clock controllers 1, 2, ..., N 2130. For example, N can be 4. The one or more cores 1, 2, ..., N 2110 can also be referred to as a tile. The uncore components 2130 can include, but is not limited to, clock circuits, interrupt controllers and circuits, debug circuits, debug manager, wrappers, command line interrupt circuits and controllers, cache coherence manager, caches, and prefetchers. That is, the uncore components 2130 represent logic outside and between multiple the one or more cores 1, 2, ..., N 2110. Each of the one or more cores 1, 2, ..., N 2110 can include CSRs for a clock gating enable bit or flag, namely, CG enable registers 1, 2, ..., N 2112. The CG enable registers 1, 2, ..., N 2112 and circuitry can enable or disable clock gating for the associated core. For example, the CG enable registers 1, 2, ..., N 2112 can each be a one or more bit field, which can be set to enable or disable clock gating. The CG enable registers 1, 2, ..., N 2112 can be set by the power management controller 2400 or by software. The software can be, for example, an operating system (O/S) of the processing system 2000 which runs on the one or more clusters 1, 2, ..., M 2100, the one or more cores 1, 2, ..., N 2110, or combinations thereof. The software can monitor the idle or sleep state (e.g., counting idle cycles) to determine an expected idle period. For example, the software, such as the operating system, can use knowledge of an expected wake-up time after initiating an idle or sleep state, such as wait for interrupt (WFI), to determine the expected idle period. In some implementations, the software can use a predictor based on idle times related to previous idle or sleep states. In some implementations, predictors can use counters that can provide hysteresis so that the predictor has memory of past events. Each of the clock controllers 1, 2, ..., N 2130 are connected to a clock generator 2400, which can provide a clock signal, namely, clocks 1, 2, ..., N 2410.

The power management controller 2200 and/or the clock gating controller 2210 can provide control outside of the clock domain (e.g., the core and/or cluster) being clock gated to determine when all activity has completed and the domain is functionally isolated and quiescent. For example, the activity can include, but is not limited to, receiving an idle period notification such as a WFI instruction retirement and checking inbound and outbound transactions, prefetcher activity, and probes. The power management controller 2200 and/or the clock gating controller 2210 can communicate with the managed cores and/or clusters, and the clock controllers 1, 2, ..., N through interconnection networks, via direct signals, or combinations thereof. The clock gating controller 2210 or software can initiate or trigger clock gating of a clock associated with the core, for example, when the core and the uncore components are quiescent and the clock gating enable bit is set and control an associated clock controller, such as clock controllers 1, 2, ..., N 2130, to gate an associated clock received from the clock generator 2400, such as clocks 1, 2, ..., N.

The activity monitors 1, 2, ..., N 2300 can detect activity in an associated core, such as an interrupt or an incoming transaction. In implementations, the activity monitors 1, 2, ..., N 2300 can be internal to the cluster 2100. In implementations, the activity monitors 1, 2, ..., N 2300 can be internal to the complex 2050. An activity monitor detecting activity can inform or signal the power management controller 2200 and/or the clock gating controller 2210 that an associated clock needs to reenabled or ungated. The power management controller 2200 and/or the clock gating controller 2210 can control an associated clock controller, such as clock controllers 1, 2, ..., N 2130, to reenable the associated clock received from the clock generator 2400, such as clocks 1, 2, ..., N. The software can clear the clock gating enable bit after a wake-up event or activity is detected.

Figure 3:
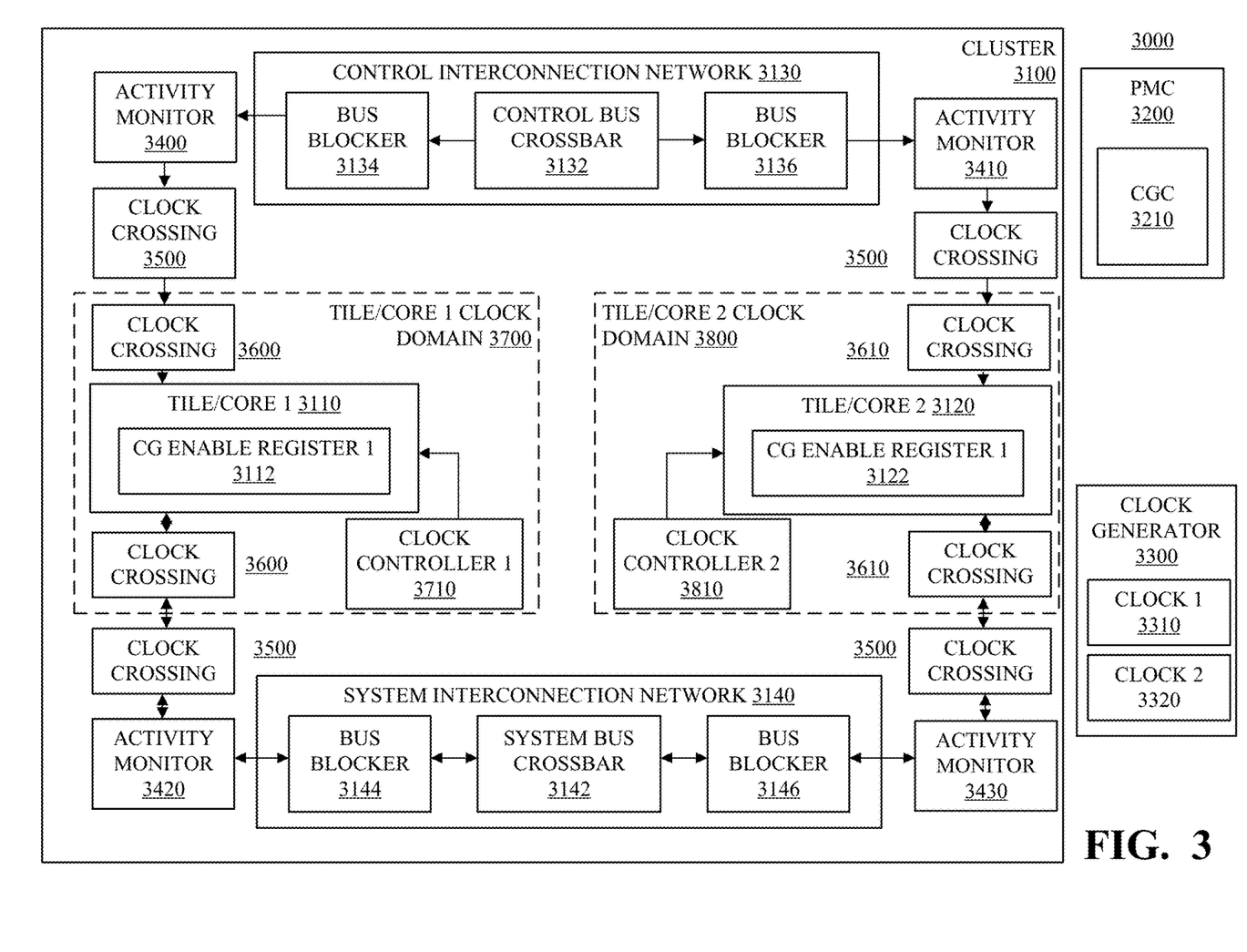
FIG. 3 is a block diagram of an example of a processing system for implementing clock gating in accordance with embodiments of this disclosure.

FIG. 3 is a block diagram of an example of a processing system 3000 for implementing clock gating in accordance with embodiments of this disclosure. The processing system 3000 can implement a pipelined architecture. The processing system 3000 can be configured to decode and execute instructions of an instruction set architecture (ISA) (e.g., a RISC-V instruction set). The instructions can execute speculatively and out-of-order in the processing system 3000. The processing system 3000 can be a compute device, a microprocessor, a microcontroller, or an IP core. The processing system 3000 can be implemented as an integrated circuit. The processing system 3000 and each element or component in the processing system 3000 is illustrative and can include additional, fewer, or different devices, entities, element, components, and the like which can be similarly or differently architected without departing from the scope of the specification and claims herein. Moreover, the illustrated devices, entities, element, and components can perform other functions without departing from the scope of the specification and claims herein. The processing system 3000 can be implemented in the processing system 1000 and/or 2000.

The processing system 3000 includes a cluster 3100 connected to a power management controller (PMC) 3200 and a clock generator 3300. The power management controller 3200 can be a power microcontroller and/or hardware or logic with a state machine. The power management controller 3200 can perform power gating and clock gating. In some implementations, the power management controller 3200 can include a clock gating controller 3210. The clock generator 3300 can generate a clock 1 3310 and a clock 2 3320.

The cluster 3100 can include a core 1 3110 and a core 2 3120 which can be connected to each other through via a control interconnection network 3130 and a system interconnection network 3140. The core 1 3110 and the core 2 3120 can also be referred to as a tile.

The control interconnection network 3130 can include a control bus crossbar 3132, a bus blocker 3134, and a bus blocker 3136. The control bus crossbar 3132 is connected to the core 1 3110 via the bus blocker 3134, an activity monitor 3400, a clock crossing circuit 3500, and a clock crossing circuit 3600. The control bus crossbar 3132 is connected to the core 2 3122 via the bus blocker 3136, an activity monitor 3410, the clock crossing circuit 3500, and a clock crossing circuit 3610.

The system interconnection network 3140 can include a system bus crossbar 3142, a bus blocker 3144, and a bus blocker 3146. The system bus crossbar 3142 is connected to the core 1 3110 via the bus blocker 3144, an activity monitor 3420, the clock crossing circuit 3500, and the clock crossing circuit 3600. The system bus crossbar 3122 is connected to the core 2 3122 via the bus blocker 3146, an activity monitor 3430, the clock crossing circuit 3500, and a clock crossing circuit 3610.

The control interconnection network 3130 and the system interconnection network 3140 can be a chip-scale interconnect such as TileLink. TileLink is a chip-scale interconnect standard providing multiple masters with incoherent or coherent memory mapped access to memory and other slave devices. TileLink can connect cores, clusters, general-purpose multiprocessors, co-processors, accelerators, DMA engines, and simple or complex devices (collectively "entities"), using a fast scalable interconnect providing both low-latency and high throughput transfers. TileLink is defined in terms of a graph of connected agents that send and receive messages over point-to-point channels within a link to perform operations on a shared address space, where an agent is an active participant that sends and receives messages in order to complete operations, a channel is a one-way communication connection between a master interface (port) and a slave interface carrying messages of homogeneous priority, and a link is a set of channels required to complete operations between two agents. In a pair of connected entities, one entity can include an agent with a master interface and the other entity can include an agent with a slave interface. The agent with the master interface can request the agent with the slave interface to perform memory operations, or request permission to transfer and cache copies of data. The agent with the slave interface manages permissions and access to a range of addresses, wherein it performs memory operations on behalf of requests arriving from the master interface. A request must always receive a response unless all transactions have completed (received a response) and the powered entity either stops sending new transactions or a bus blocker is enabled to react to new transactions. Consequently, one entity cannot be powered down while the other entity is powered on. In implementations, the control interconnection network 3130 can be a slave interface and the system interconnection network 3140 can be a master interface.

A bus blocker, such as the bus blockers 3134, 3136, 3144, and 3146 can include registers, circuitry, and logic to maintain information and determine whether an entity associated with or corresponding to the bus blocker can be clock gated. The bus blocker can report, via a signal or register polling, a status of the associated entity with respect to pending transactions or operations. A bus blocker can be used to isolate a unit or region of logic to prepare for power gating or clock gating. The bus blocker can respond to any transaction with an error condition or it can backpressure the request, essentially delaying the transaction while the unit or region of logic wakes up to service the request. Clock gating saves less power, but offers a much faster wake-up, so the bus blocker is more likely to delay a response and therefore be used as an activity monitor to wake-up the clocks and complete the request.

The core 1 3110 is associated with a core 1 clock domain 3700, which uses the clock 1 3310 as controlled by a clock controller 1 3710 and the power management controller 3200 and/or the clock gating controller 3210 as described herein. The core 1 clock domain 3700 is boundary defined by the clock crossing circuit 3500 and the clock crossing circuit 3600 and includes the core 1 3110 and uncore components as defined herein. The core 2 3120 is associated with a core 2 clock domain 3800, which uses the clock 2 3320 as controlled by a clock controller 2 3810 and the power management controller 3200 and/or the clock gating controller 3210 as described herein. The core 2 clock domain 3800 is boundary defined by the clock crossing circuit 3500 and the clock crossing circuit 3610 and includes the core 2 3120 and uncore components as defined herein.

The core 1 3110 can include a CSR for a clock gating enable bit or flag, namely, CG enable register 3112. The CG enable register 3112 and circuitry can enable or disable clock gating for the core 1 3110. For example, the CG enable register 3112 can be a one or more bit field, which can be set to enable or disable clock gating. The CG enable register 3112 can be set by the power management controller 3200 and/or the clock gating controller 3210 or by software as described herein. The core 2 3120 can include a CSR for a clock gating enable bit or flag, namely, CG enable register 3122. The CG enable register 3122 and circuitry can enable or disable clock gating for the core 2 3120. For example, the CG enable register 3122 can be a one or more bit field, which can be set to enable or disable clock gating. The CG enable register 3122 can be set by the power management controller 3200 and/or the clock gating controller 3210 or by software as described herein. The software can be, for example, an operating system (O/S) of the processing system 3000 which runs on the cluster 3100, the core 1 3110, the core 2 3120, or combinations thereof. The software can monitor the idle or sleep state (e.g., counting idle cycles) to determine an expected idle period. For example, the software, such as the operating system, can use knowledge of an expected wake-up time after initiating an idle or sleep state, such as wait for interrupt (WFI), to determine the expected idle period. In some implementations, the software can use a predictor based on idle times related to previous idle or sleep states. In some implementations, predictors can use counters that can provide hysteresis so that the predictor has memory of past events.

The power management controller 3200 and/or the clock gating controller 3210 can provide control outside of the clock domain (e.g., the core and/or cluster) being clock gated to determine when all activity has completed and the domain is functionally isolated and quiescent. For example, the clock domain can be the core 1 clock domain 3700 and the core 2 clock domain 3800. Some of this activity can be signaled to the power management controller 3200 and/or the clock gating controller 3210 via bus blockers such as the bus blockers 3134, 3136, 3144, and 3146. For example, the activity can include, but is not limited to, receiving an idle period notification such as a WFI instruction retirement and checking inbound and outbound transactions, prefetcher activity, and probes. The power management controller 3200 and/or the clock gating controller 3210 can communicate with the managed cores and/or cluster, and the clock controllers through interconnection networks, via direct signals, or combinations thereof. The clock gating controller 3210 or software can determine if an idle period of a core(s) is greater than the clock gating threshold time. The power management controller 3200 and/or clock gating controller 3210 can control an associated clock controller, such as clock controller 1 3710 and/or clock controller 2 3810, to gate an associated clock received from the clock generator 3400, such as clock 1 3320 and clock 2 3320 when the core 1 3110 and/or the core 2 3120, each with respective uncore components, is quiescent and the clock gating enable bit is set.

The activity monitors 3400, 3410, 3420, and 3430 can detect activity in an associated core, such as an interrupt, an incoming transaction, or a probe request. An activity monitor detecting activity can inform or signal the power management controller 3200 and/or the clock gating controller 3210 that an associated clock needs to reenabled or ungated. The power management controller 3200 and/or the clock gating controller 3210 can control an associated clock controller, such as clock controller 1 3710 and/or clock controller 2 3810 to disable the clock gate to reenable the associated clock received from the clock generator 2400, such as clock 1 3310 and/or clock 2 3320. The software can clear the clock gating enable bit after a wake-up event or activity is detected.

Figure 4:
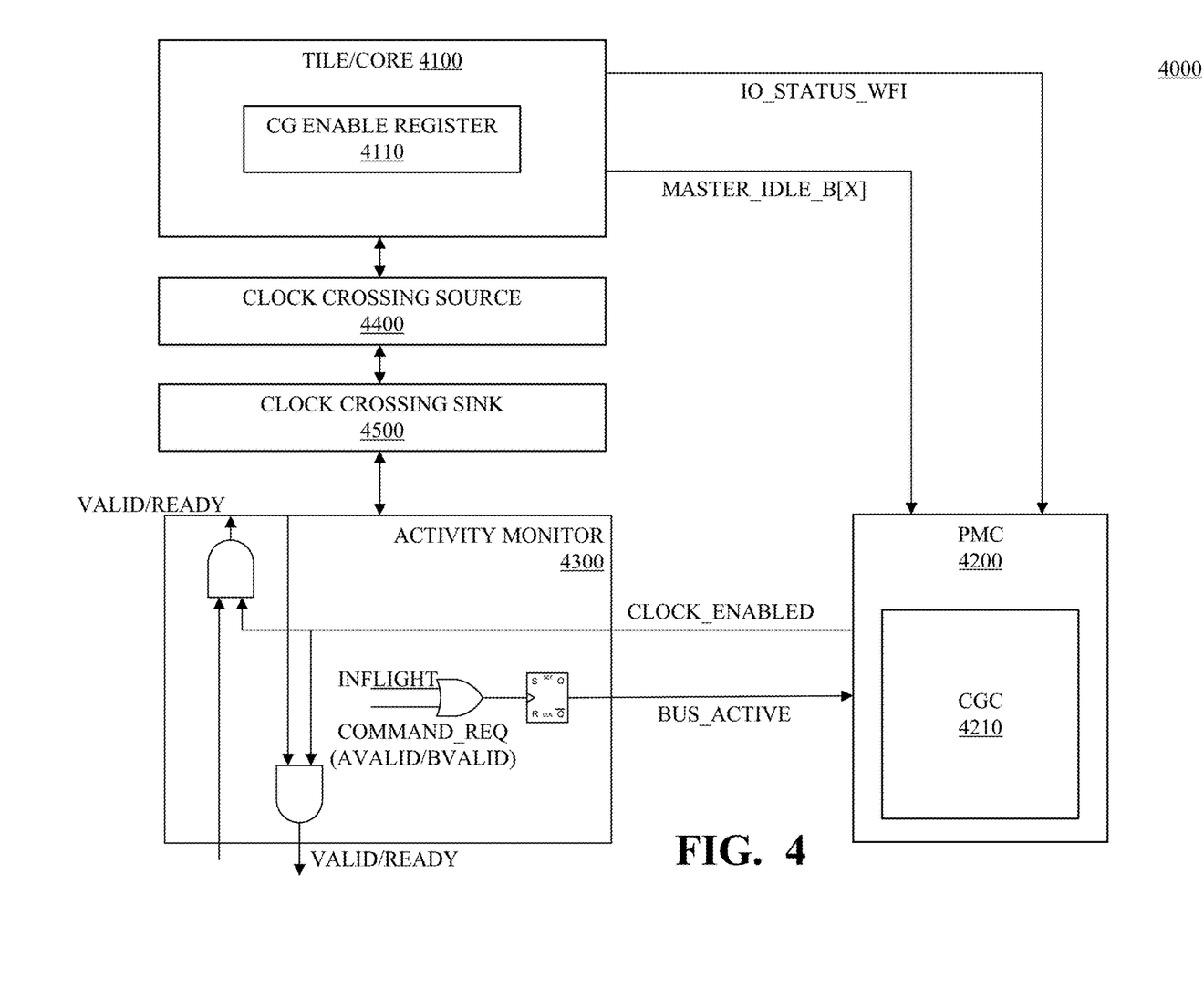
FIG. 4 is a block diagram of an example of a processing system for implementing clock gating in accordance with embodiments of this disclosure.

FIG. 4 is a block diagram of an example of a processing system 4000 for implementing clock gating in accordance with embodiments of this disclosure. The processing system 4000 can implement a pipelined architecture. The processing system 4000 can be configured to decode and execute instructions of an instruction set architecture (ISA) (e.g., a RISC-V instruction set). The instructions can execute speculatively and out-of-order in the processing system 4000. The processing system 4000 can be a compute device, a microprocessor, a microcontroller, or an IP core. The processing system 4000 can be implemented as an integrated circuit. The processing system 4000 and each element or component in the processing system 4000 is illustrative and can include additional, fewer, or different devices, entities, element, components, and the like which can be similarly or differently architected without departing from the scope of the specification and claims herein. Moreover, the illustrated devices, entities, element, and components can perform other functions without departing from the scope of the specification and claims herein. The processing system 4000 can be implemented in the processing system 1000, 2000, and 3000.

The processing system 4000 includes a core 4100 connected to a power management controller (PMC) 4200. The core 4100 can include a CSR for a clock gating enable, namely, CG enable register 4110. The CG enable register 4110 and circuitry can enable or disable clock gating for the core 4100. For example, the CG enable register 4110 can be a one or more bit field, which can be set to enable or disable clock gating. The CG enable register 4110 can be set by the power management controller 4200 and/or the clock gating controller 4210 or by software as described herein. The software can be, for example, an operating system (O/S) of the processing system 4000 which runs on the core 4100. The software can monitor the idle or sleep state (e.g., counting idle cycles) to determine an expected idle period. For example, the software, such as the operating system, can use knowledge of an expected wake-up time after initiating an idle or sleep state, such as wait for interrupt (WFI), to determine the expected idle period. In some implementations, the software can use a predictor based on idle times related to previous idle or sleep states. In some implementations, predictors can use counters that can provide hysteresis so that the predictor has memory of past events.

The power management controller 4200 can be a power microcontroller and/or hardware or logic with a state machine. The power management controller 4200 can perform power gating and clock gating. In some implementations, the power management controller 4200 can include a clock gating controller 4210. The core 4100 is also connected to an activity monitor 4300 via a clock crossing source 4400 and a clock crossing sink 4500.

The power management controller 4200 and/or the clock gating controller 4210 can provide control outside of the clock domain (e.g., the core and/or cluster) being clock gated to determine when all activity has completed and the domain is functionally isolated and quiescent. For example, the core 4100 can provide a WFI instruction retirement signal (IO_STATUS_WFI) which indicates that the core has executed a WFI instruction. All entities in the core, such as prefetchers, caches, fetch units, and the like provide an output signal that all outstanding transactions are complete (MASTER_IDLE_B(X)). That is, quiescence is needed to initiate clock gating. The power management controller 4200 and/or the clock gating controller 4210 can communicate with the managed core through interconnection networks, via direct signals, or combinations thereof. The clock gating controller 4210 or software can control an associated clock controller to gate an associated clock received from a clock generator when the core 4100 and additional logic such as uncore components are quiescent and the clock gating enable bit is set. The power management controller 4200 and/or the clock gating controller 4210 can send a clock gating enabled signal to the activity monitor 4300 (CLOCK_ENABLED).

The activity monitor 4300 can detect activity in the core 4100 via detection of an incoming probe request (COMMAND_REQ (AVALID or BVALID)). Upon detection of the request, the activity monitor 4300 can assert an activity detected signal (BUS_ACTIVE) to the power management controller 4200 and/or the clock gating controller 4210 to ungate or reenable the clock to the core 4100. The activity monitor 4300 can logically AND the clock gating enabled signal (CLOCK_ENABLED) and valid and/or ready signals to create back pressure when the clock is gated. The software can clear the clock gating enable bit after a wake-up event or activity is detected.

Figure 5:
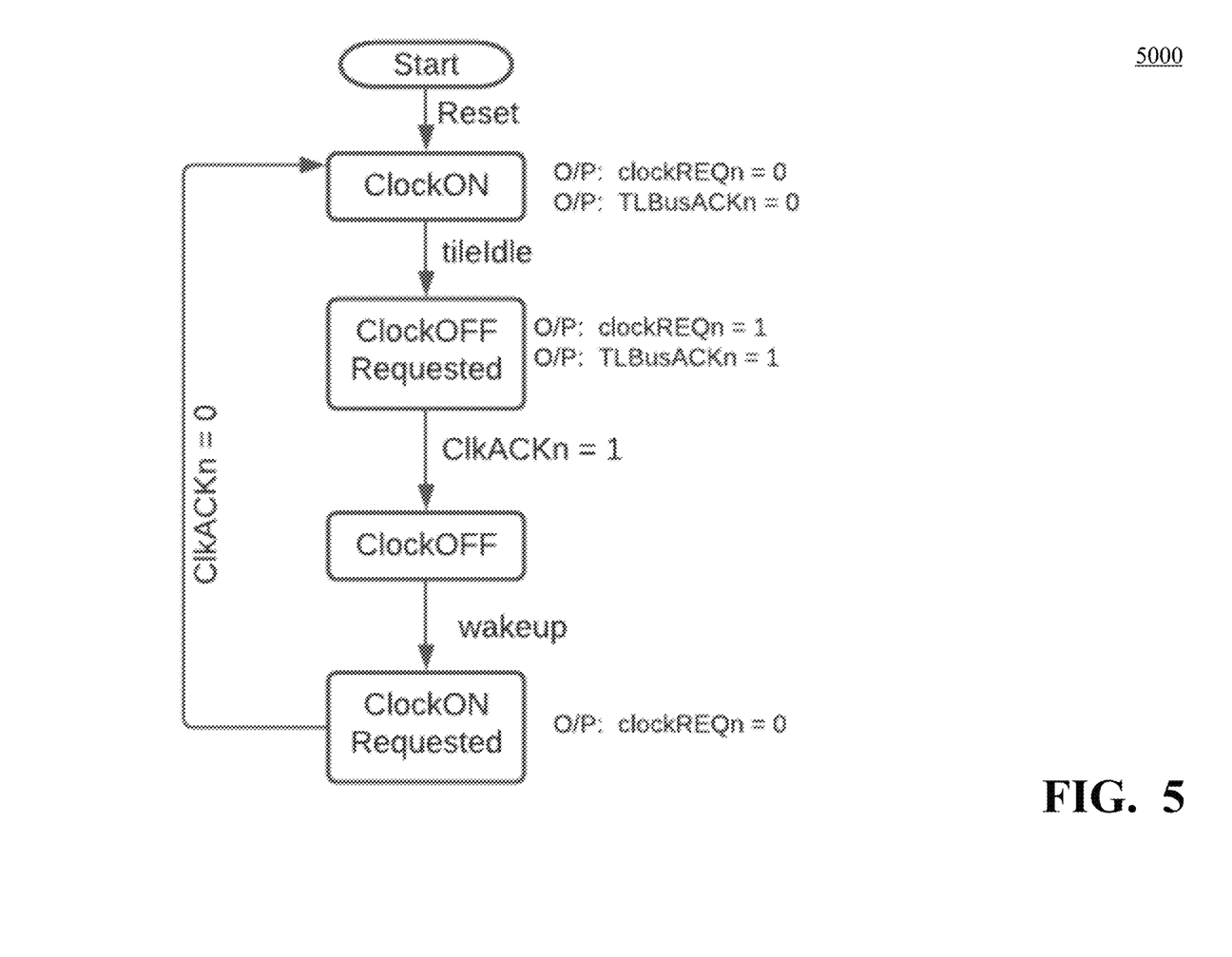
FIG. 5 is a diagram of an example of a state machine for implementing clock gating in accordance with embodiments of this disclosure.

FIG. 5 is an example of a state machine 5000. The power management controller and/or a clock gating controller executes in accordance with a state machine associated with each core. As noted, the power management controller and/or the clock gating controller obtains or collects activity information. The state machine 5000 transitions to Clock-OFF Requested state once WFI (IO_STATUS_WFI) from a core is high and all masters of that core are idle (MASTER_BUSY=0) and a clock gating enable bit is set. The state machine 5000 then requests power management controller 4200 and/or the clock gating controller to gate the clock. Once the power management controller 4200 and/or the clock gating controller acknowledges the clock gating request, the state machine 5000 enters ClockOFF state. While in ClockOFF state if any interrupt wake-up or bus activity is observed, the state machine 5000 enters Clock-ONRequested state and requests the power management controller 4200 and/or the clock gating controller to ungate the clock. After receiving the acknowledgement, the state machine 5000 re-enters ClockON state.

Figure 6:
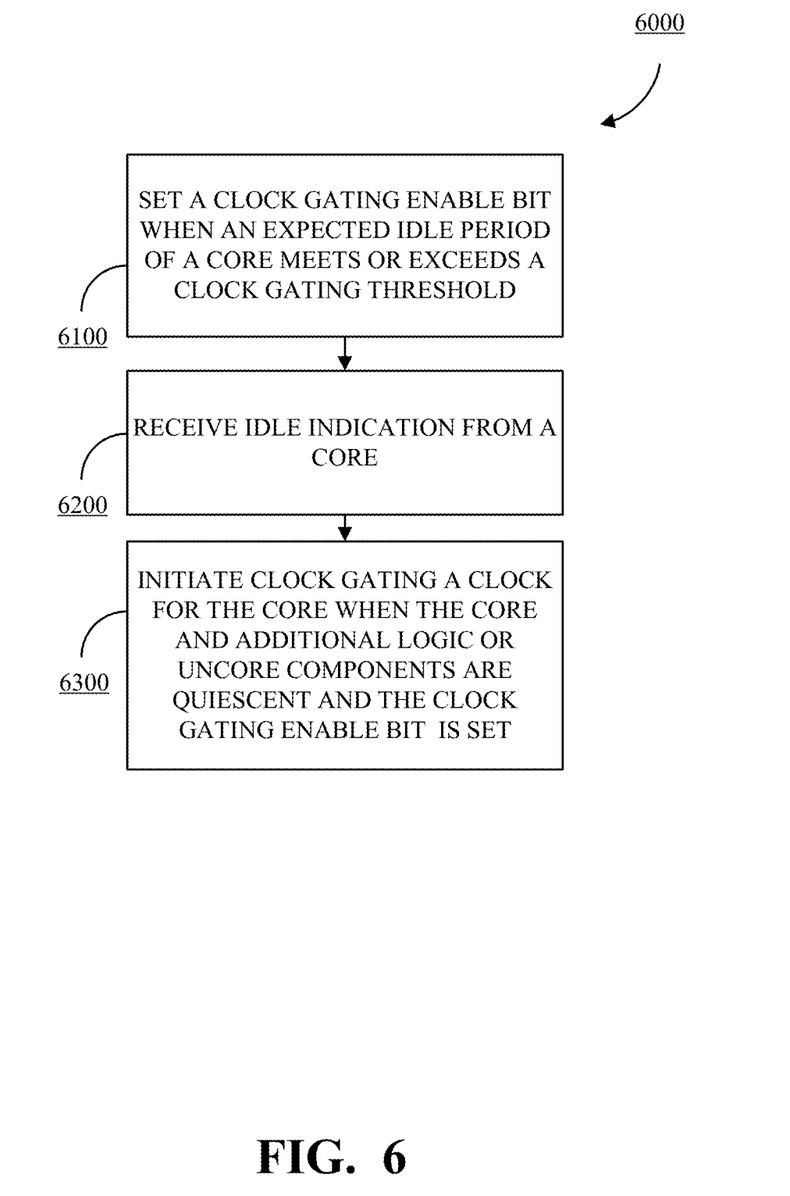
FIG. 6 is a flowchart of an example technique or method for clock gating in accordance with embodiments of this disclosure.

FIG. 6 is a diagram of an example technique 6000 for clock gating in accordance with embodiments of this disclosure. The technique 6000 includes: setting 6100 a clock gating enable bit when an expected idle period of a core meets or exceeds a clock gating threshold; receiving 6200 idle indication from a core; and initiating 6300 clock gating a clock for the core when the core and additional logic or uncore components are quiescent and the clock gating enable bit is set. The technique 6000 can be implemented, for example, in the processing system 1000, 2000, 3000, 4000, or 5000, as appropriate and applicable. In FIG. 6, the core is a representative clock domain to be clock gated. The clock domain can be a core(s), cluster(s), complex(es), or combinations thereof.

The technique 6000 includes setting 6100 a clock gating enable bit when an expected idle period of a core meets or exceeds a clock gating threshold. In implementations, the clock gating threshold is a defined magnitude greater than a clock wake-up time. In implementations, the clock gating threshold is based on frequency of idle state to non-idle state on a per core basis. In implementations, the clock gating threshold is dynamically set based on performance.

The technique 6000 includes receiving 6200 idle indication from a core. In implementations, a processing system component such as software or a power management unit monitors idle or sleep states to determine the expected idle period. In implementations, a processing system component counts idle cycles to determine the expected idle period. In implementations, the processing system component uses knowledge of an expected wake-up time after initiating an idle or sleep state to determine the expected idle period. In implementations, the processing system component uses a predictor of idle or sleep times to determine the expected idle period.

The technique 6000 includes initiating 6300 clock gating a clock for the core when the core and additional logic or uncore components are quiescent and the clock gating enable bit is set. In implementations, bus blockers notify when the core and the additional logic is quiescent. In implementations, an activity monitor detects activity in the core and signals the power management unit to reenable the clock.

Figure 7:
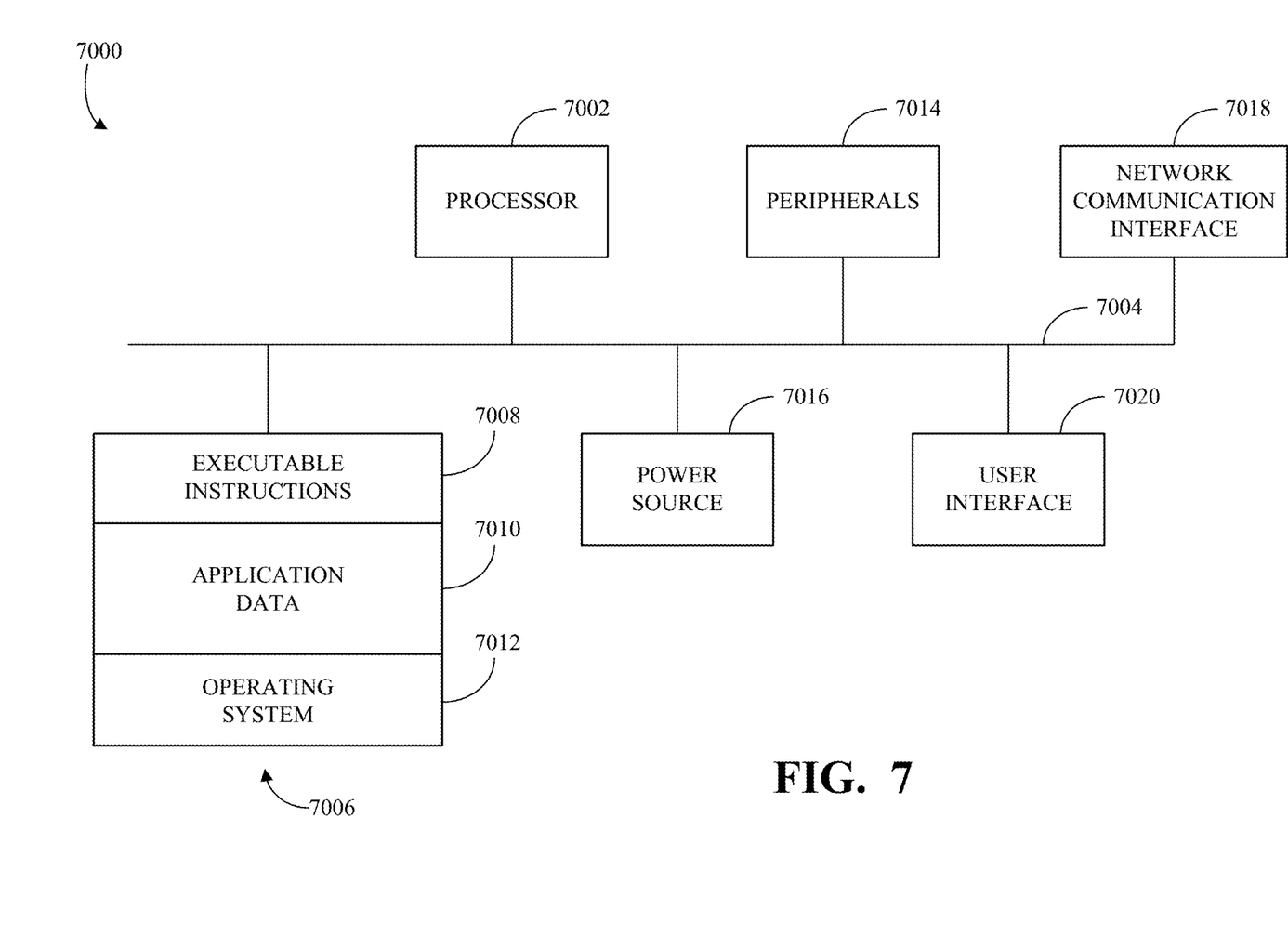
FIG. 7 is a block diagram of an example of a system for facilitating generation of a circuit representation.

FIG. 7 is a block diagram of an example of a system 7000 for facilitating generation of a circuit representation, and/or for programming or manufacturing an integrated circuit. The system 7000 is an example of an internal configuration of a computing device or processor system. For example, the system 7000 may be used to generate a file that generates a circuit representation of an integrated circuit including a processor system or core (e.g., the processor system 1000, the processor system 2000, the processor system 3000, or the processing system 4000). The system 7000 can include components or units, such as a processor 7002, a bus 7004, a memory 7006, peripherals 7014, a power source 7016, a network communication interface 7018, a user interface 7020, other suitable components, or a combination thereof.

The processor 7002 can be a central processing unit (CPU), such as a microprocessor, and can include single or multiple processors having single or multiple processing cores. Alternatively, the processor 7002 can include another type of device, or multiple devices, now existing or hereafter developed, capable of manipulating or processing information. For example, the processor 7002 can include multiple processors interconnected in any manner, including hard-wired or networked, including wirelessly networked. In some implementations, the operations of the processor 7002 can be distributed across multiple physical devices or units that can be coupled directly or across a local area or other suitable type of network. In some implementations, the processor 7002 can include a cache, or cache memory, for local storage of operating data or instructions.

The memory 7006 can include volatile memory, non-volatile memory, or a combination thereof. For example, the memory 606 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 7006 can include another type of device, or multiple devices, now existing or hereafter developed, capable of storing data or instructions for processing by the processor 7002. The processor 7002 can access or manipulate data in the memory 7006 via the bus 7004. Although shown as a single block in FIG. 7, the memory 7006 can be implemented as multiple units. For example, a system 7000 can include volatile memory, such as random access memory (RAM), and persistent memory, such as a hard drive or other storage.

The memory 7006 can include executable instructions 7008, data, such as application data 7010, an operating system 7012, or a combination thereof, for immediate access by the processor 7002. The executable instructions 7008 can include, for example, one or more application programs, which can be loaded or copied, in whole or in part, from non-volatile memory to volatile memory to be executed by the processor 7002. The executable instructions 7008 can be organized into programmable modules or algorithms, functional programs, codes, code segments, or combinations thereof to perform various functions described herein. For example, the executable instructions 7008 can include instructions executable by the processor 7002 to cause the system 7000 to automatically, in response to a command, generate an integrated circuit design and associated test results based on a design parameters data structure. The application data 7010 can include, for example, user files, database catalogs or dictionaries, configuration information or functional programs, such as a web browser, a web server, a database server, or a combination thereof. The operating system 7012 can be, for example, Microsoft Windows®, macOS®, or Linux®; an operating system for a small device, such as a smartphone or tablet device; or an operating system for a large device, such as a mainframe computer. The memory 7006 can comprise one or more devices and can utilize one or more types of storage, such as solid-state or magnetic storage.

The peripherals 7014 can be coupled to the processor 7002 via the bus 7004. The peripherals 7014 can be sensors or detectors, or devices containing any number of sensors or detectors, which can monitor the system 7000 itself or the environment around the system 7000. For example, a system 7000 can contain a temperature sensor for measuring temperatures of components of the system 7000, such as the processor 7002. Other sensors or detectors can be used with the system 7000, as can be contemplated. In some implementations, the power source 7016 can be a battery, and the system 7000 can operate independently of an external power distribution system. Any of the components of the system 7000, such as the peripherals 7014 or the power source 7016, can communicate with the processor 7002 via the bus 7004.

The network communication interface 7018 can also be coupled to the processor 7002 via the bus 7004. In some implementations, the network communication interface 7018 can comprise one or more transceivers. The network communication interface 7018 can, for example, provide a connection or link to a network, via a network interface, which can be a wired network interface, such as Ethernet, or a wireless network interface. For example, the system 7000 can communicate with other devices via the network communication interface 7018 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 7020 can include a display; a positional input device, such as a mouse, touchpad, touchscreen, or the like; a keyboard; or other suitable human or machine interface devices. The user interface 7020 can be coupled to the processor 7002 via the bus 7004. Other interface devices that permit a user to program or otherwise use the system 7000 can be provided in addition to or as an alternative to a display. In some implementations, the user interface 7020 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 7014. The operations of the processor 7002 can be distributed across multiple clients or servers, which can be coupled directly or across a local area or other suitable type of network. The memory 7006 can be distributed across multiple clients or servers, such as network-based memory or memory in multiple clients or servers performing the operations of clients or servers. Although depicted here as a single bus, the bus 7004 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming. In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

In implementations, a processing system includes one or more cores, each core including a clock gating enable bit register which is set when an expected idle period of the core meets or exceeds a clock gating threshold, and a power management unit connected to the one or more cores. The power management unit receives an idle notification from a core of the one or more cores and initiates clock gating a clock associated with the core of the one or more cores when the core of the one or more cores and additional logic is quiescent and the clock gating enable bit register is set, where the clock gating threshold is a defined magnitude greater than a clock wake-up time.

In some implementations, the clock gating threshold is based on frequency of idle state to non-idle state on a per core basis. In some implementations, the clock gating threshold is dynamically set based on performance. In some implementations, the clock gating enable bit register is a configuration and status register. In some implementations, the power management unit reenables the clock associated with the core of the one or more cores when activity is detected for the clock. In some implementations, the power management unit includes an activity monitor for each of the one or more cores, each activity monitor detects activity in an associated core and signal the power management unit to reenable an associated clock. In some implementations, the clock gating enable bit register is set by software. In some implementations, the software monitors idle or sleep states to determine the expected idle period. In some implementations, the software counts idle cycles to determine the expected idle period. In some implementations, the software uses knowledge of an expected wake-up time after initiating an idle or sleep state to determine the expected idle period. In some implementations, the software uses a predictor of idle or sleep times to determine the expected idle period. In some implementations, the predictor uses a counter to provide hysteresis to account for past events. In some implementations, the clock gating enable bit register is set by the power management unit. In some implementations, the power management unit includes a clock gating controller to initiate clock gating by an associated clock controller. In some implementations, one or more bus blockers signal the power management unit when the core of the one or more cores and additional logic is quiescent.

In implementations, a method includes setting, by a processing system component, a clock gating enable bit for a core when an expected idle period of the core meets or exceeds a clock gating threshold, receiving, by power management unit, an idle indication from the core, and initiating, by the power management unit, clock gating of a clock associated with the core when the core and additional logic are quiescent and the clock gating enable bit is set, where the clock gating threshold is a defined magnitude greater than a clock wake-up time.

In some implementations, the clock gating threshold is based on frequency of idle state to non-idle state on a per core basis. In some implementations, the clock gating threshold is dynamically set based on performance. In some implementations, the method includes detecting, by an activity monitor, the activity in the core; and signaling, the power management unit by the activity monitor, to reenable the clock. In some implementations, the method includes monitoring, by the processing system component, idle or sleep states to determine the expected idle period. In some implementations, the method includes counting, by the processing system component, idle cycles to determine the expected idle period. In some implementations, the method includes using, by the processing system component, knowledge of an expected wake-up time after initiating an idle or sleep state to determine the expected idle period. In some implementations, the method includes using, by the processing system component, a predictor of idle or sleep times to determine the expected idle period. In some implementations, the method includes notifying, the power management unit by bus blockers, when the core and the additional logic is quiescent.

In implementations, a non-transitory computer readable medium comprising a circuit representation that, when processed by a computer, is used to program or manufacture an integrated circuit comprising one or more cores, each core including a clock gating enable bit register which is set when an expected idle period of the core meets or exceeds a clock gating threshold; and a power management unit connected to the one or more cores. The power management unit receives an idle notification from a core of the one or more cores; and initiates clock gating a clock associated with the core of the one or more cores when the core of the one or more cores and additional logic is quiescent and the clock gating enable bit register is set, where the clock gating threshold is a defined magnitude greater than a clock wake-up time.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more computer readable mediums having computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A processing system comprising:
one or more cores, each core including a clock gating enable bit register which is set when an expected idle period of the core meets or exceeds a clock gating threshold; and
a power management unit connected to the one or more cores, wherein the power management unit is configured to:
receive an idle notification from a core of the one or more cores; and
initiate clock gating a clock associated with the core of the one or more cores when the core of the one or more cores and additional logic is quiescent and the clock gating enable bit register is set,
wherein the clock gating threshold is a defined magnitude greater than a clock wake-up time.

2. The processing system of claim 1, wherein the clock gating threshold is based on frequency of idle state to non-idle state on a per core basis.

3. The processing system of claim 1, wherein the clock gating threshold is dynamically set based on performance.

4. The processing system of claim 1, wherein the clock gating enable bit register is a configuration and status register.

5. The processing system of claim 1, wherein the power management unit is further configured to reenable the clock associated with the core of the one or more cores when activity is detected for the clock.

6. The processing system of claim 1, wherein the power management unit includes an activity monitor for each of the one or more cores, each activity monitor is configured to detect activity in an associated core and signal the power management unit to reenable an associated clock.

7. The processing system of claim 1, wherein the clock gating enable bit register is set by software.

8. The processing system of claim 7, wherein the software is configured to monitor idle or sleep states to determine the expected idle period.

9. The processing system of claim 7, wherein the software is configured to count idle cycles to determine the expected idle period.

10. The processing system of claim 7, wherein the software is configured to use knowledge of an expected wake-up time after initiating an idle or sleep state to determine the expected idle period.

11. The processing system of claim 7, wherein the software is configured to use a predictor of idle or sleep times to determine the expected idle period.

12. The processing system of claim 11, wherein the predictor is configured to use a counter to provide hysteresis to account for past events.

13. The processing system of claim 1, wherein the clock gating enable bit register is set by the power management unit.

14. The processing system of claim 1, wherein the power management unit includes a clock gating controller to initiate clock gating by an associated clock controller.

15. The processing system of claim 1, further comprising:
one or more bus blockers configured to signal the power management unit when the core of the one or more cores and additional logic is quiescent.

16. A method comprising:
setting, by a processing system component, a clock gating enable bit for a core when an expected idle period of the core meets or exceeds a clock gating threshold;
receiving, by power management unit, an idle indication from the core; and
initiating, by the power management unit, clock gating of a clock associated with the core when the core and additional logic are quiescent and the clock gating enable bit is set, wherein the clock gating threshold is a defined magnitude greater than a clock wake-up time.

17. The method of any of claim 16, further comprising:
detecting, by an activity monitor, an activity in the core; and
signaling, the power management unit by the activity monitor based on the activity, to reenable the clock.

18. The method of claim 16, further comprising:
using, by the processing system component, knowledge of an expected wake-up time after initiating an idle or sleep state to determine the expected idle period.

19. The method of claim 16, further comprising:
notifying, the power management unit by bus blockers, when the core and the additional logic is quiescent.

20. A non-transitory computer readable medium comprising a circuit representation that, when processed by a computer, is used to program or manufacture an integrated circuit comprising:

one or more cores, each core including a clock gating enable bit register which is set when an expected idle period of the core meets or exceeds a clock gating threshold; and a power management unit connected to the one or more cores, wherein the power management unit is configured to:

receive an idle notification from a core of the one or more cores; and initiate clock gating a clock associated with the core of the one or more cores when the core of the one or more cores and additional logic is quiescent and the clock gating enable bit register is set, wherein the clock gating threshold is a defined magnitude greater than a clock wake-up time.

* * * * *